US012659406B2

(12) United States Patent
Edwards et al.

(10) Patent No.: US 12,659,406 B2
(45) Date of Patent: *Jun. 16, 2026

(54) SYSTEM AND METHOD FOR SERVING MULTIPLE CUSTOMERS BY A LIVE AGENT

(71) Applicant: Capital One Services, LLC, McLean, VA (US)

(72) Inventors: Joshua Edwards, Philadelphia, PA (US); Guadalupe Bonilla, Hyattsville, MD (US); Tyler Maiman, Melville, NY (US); Michael Mossoba, Great Falls, VA (US); Vahid Khanagha, Rockville, MD (US); Aysu Ezen Can, Cary, NC (US); Mia Rodriguez, Arlington, VA (US); Feng Qiu, Newark, DE (US); Alexander Lin, Arlington, VA (US); Meredith L. Critzer, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 45 days.

This patent is subject to a terminal disclaimer.

(21) Appl. No.: 18/744,909

(22) Filed: Jun. 17, 2024

(65) Prior Publication Data

US 2024/0406315 A1     Dec. 5, 2024

Related U.S. Application Data

(63) Continuation of application No. 17/698,717, filed on Mar. 18, 2022, now Pat. No. 12,022,026.

(51) Int. Cl.
H04M 3/51       (2006.01)
G06F 40/166    (2020.01)
(Continued)

(52) U.S. Cl.
CPC ........ H04M 3/5166 (2013.01); G06F 40/166 (2020.01); H04M 3/5191 (2013.01)

(58) Field of Classification Search
CPC .. H04M 3/5166; H04M 3/5191; G06F 40/166
(Continued)

(56) References Cited

U.S. PATENT DOCUMENTS

| | | | |
|---|---|---|---|
| 11,004,440 B2 | 5/2021 | Zoller et al. | |
| 11,011,176 B1 | 5/2021 | Hardage et al. | |

(Continued)

*Primary Examiner* — Thjuan K Addy
(74) *Attorney, Agent, or Firm* — Sterne, Kessler, Goldstein & Fox P.L.L.C.

(57) ABSTRACT

A system and method for allowing a single live customer service agent to simultaneously serve multiple customers. According to various embodiments, a virtual agent operates at the front end to receive and attempt to handle customer issues. The virtual agent employs speech recognition and intent mapping in order to generate a proposed response that attempts to identify and resolve customer issues. In some scenarios, the proposed response includes both a response message and a response action to be taken. A chat history and the proposed response is then provided to the live agent. The live agent reviews the information provided, and determines whether the proposed response is appropriate. The live agent then approves the response or revises or replaces the response. The final response is sent back to the virtual agent for processing and providing to the customer.

20 Claims, 6 Drawing Sheets

(51) Int. Cl.
*G06F 40/30* (2020.01)
*G06F 40/35* (2020.01)

(58) Field of Classification Search
USPC ..... 379/265.01, 242, 265.05, 265.11, 265.02
See application file for complete search history.

(56) References Cited

U.S. PATENT DOCUMENTS

| | | |
|---|---|---|
| 11,012,560 B2 | 5/2021 | Segalis et al. |
| 11,176,942 B2 | 11/2021 | Fabrizzio et al. |
| 2018/0007102 A1* | 1/2018 | Klein ................... H04L 65/612 |
| 2018/0007204 A1 | 1/2018 | Klein et al. |
| 2020/0125919 A1 | 4/2020 | Liu et al. |
| 2021/0136204 A1 | 5/2021 | Adibi et al. |
| 2023/0300246 A1 | 9/2023 | Edwards et al. |

* cited by examiner

400

Receive customer message — 410

Convert to text — 420

Map intent — 430

Generate proposed response — 440

Receive final response from agent — 450

Convert to speech — 460

Synthesize voice — 470

Output response to customer — 480

500

SYSTEM AND METHOD FOR SERVING MULTIPLE CUSTOMERS BY A LIVE AGENT

CROSS-REFERENCE TO RELATED APPLICATIONS

This application is a continuation of U.S. application Ser. No. 17/698,717, filed Mar. 18, 2022, the contents of which are hereby incorporated by reference in their entirety.

TECHNICAL FIELD

Embodiments of the present disclosure are related to call processing centers, and specifically to a system and method for allowing a single live agent to simultaneously serve multiple customers.

BACKGROUND

Customer service centers and other support centers allow customers to call an agent with questions or to have their problems resolved. Although traditionally such calls would be answered by a live agent that would field the questions and attempt to address the customer's concerns, more recent service centers employ a virtual agent or both that operates at the front line. The virtual agent is run by a computer system that attempts to match customer responses with predetermined operations. The computer system continues in this manner until the customer requests a live agent, or until the virtual agent can no longer find sufficient answers to customer responses. Live agents in these systems are reserved for those cases in which the computer cannot answer a customer's query. Whether supported by a virtual agent or not, the live agent receives a customer call, and personally intervenes to resolve the customer's issues. Once the live agent concludes the call with the customer, the live agent is then available to take another call from another customer.

SUMMARY

Aspects disclosed herein provide systems and methods for simultaneously serving multiple customers by a live agent. The systems and methods employ speech recognition and intent mapping to determine an intent of the customer's statements and/or inquiries. Based on this intent, the systems and methods generate automated responses attempt to address the customer's issues.

In aspects, the systems and methods provides the automated responses to a live agent for review. In aspects, the live agent is also provided with a chat history that includes previous customer statements and responses for review. The live agent reviews the chat history and the proposed automated response and determines whether the replace or revise the proposed response.

In aspects, the systems and methods provide the live agent with a user interface through which to revise or replace a proposed response. The user interface includes a customer status portion by which the live agent can see the status of different conversations with different customers and select one of the customers for review. The user interface further includes a response editing portion. In aspects, the response editing portion is a text editor that allows the live agent to revise the text of a response. In other aspects, the response editing portion is a voice recording mechanism to record a spoken response provided by the live agent.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS/FIGURES

The accompanying drawings are incorporated herein and form a part of the specification.

In the drawings, reference numbers generally indicate identical or similar elements. Additionally, generally, the left-most digit(s) of a reference number identifies the drawing in which the reference number first appears.

DETAILED DESCRIPTION

Figure 1:
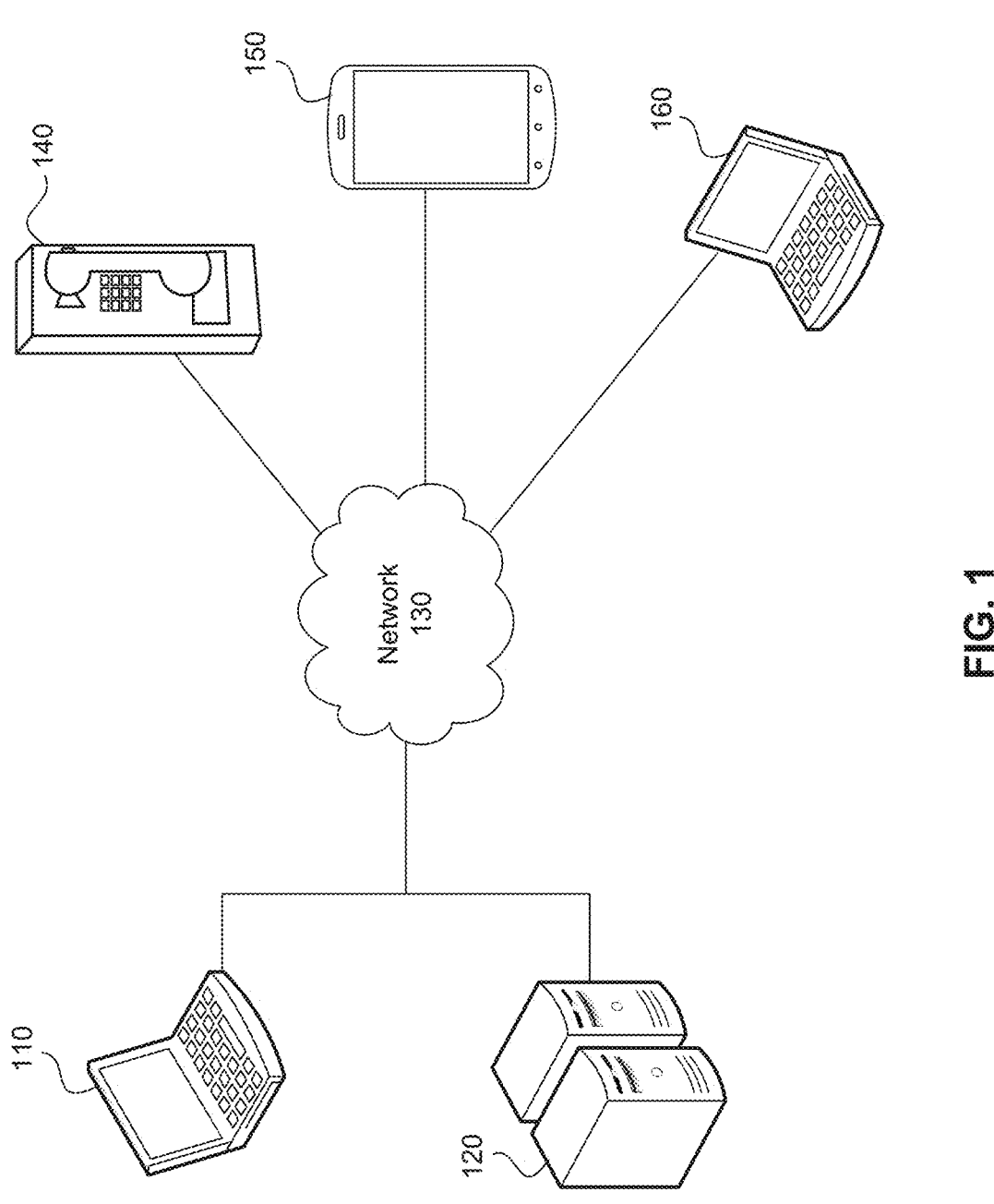
FIG. 1 illustrates an exemplary call agent environment according to embodiments.

Provided herein are a method, a system, computer program product embodiments, and/or combinations and subcombinations thereof for simultaneous servicing of multiple customers by a live agent.

Typically, any given call agent within a call service center is only capable of servicing one customer at a time. This is primarily to ensure that each customer is given a satisfying experience and feels as though their needs were being met during that conversation. This applies even when automated virtual bots perform most of the call handling because live agents in those environments take on a supervisory role to the virtual agents, only handling calls that are "escalated" by either the customer or the virtual agent. But this is very inefficient, and there are often scenarios where it would be beneficial to have a single live agent servicing multiple customers at the same time.

Embodiments of the present disclosure support this objective by assigning a plurality of current callers to the live agent. A virtual agent functions in the foreground to analyze customer messages and prepare proposed actions and responses. Rather than taking automatic action, the virtual agent forwards the proposed actions and responses to the live agent for review and approval. In embodiments, the customer message is received in a voice format and the virtual agent employs voice recognition in order to convert the message to text for analysis and logging.

In embodiments, a custom user interface allows the live agent to review a recent chat history as well as the proposed actions/responses. The live agent is also provided with the options to approve, edit, or replace the proposed actions/responses. In some embodiments, the user interface includes a listing of the live agent's current customers, selectable such that the live agent can toggle between them at will.

According to some embodiments, when the live agent selects to edit the response, a text editing field provides the live agent the ability to enter changes to the proposed response. Alternatively, when the live agent selects to replace the proposed response, the live agent is provided with the option of typing or speaking the replacement response. Once the live agent has made all desired changes to the proposed response, the final response is provided back to the virtual agent system for execution. In an embodiment, the replacement message is provided to the virtual agent system in real-time without waiting until receipt of the entirety of the replacement message.

In embodiments, the virtual agent system receives the final response from the live agent. When the response includes an action, the virtual agent system performs the action. Then the virtual agent prepares the final response for sending to the customer. For example, if the final response was provided as speech, the virtual agent system converts it to text. Then, depending on whether the customer conversation is a voice conversation or a text conversation, the virtual agent system again converts the final response back to speech, in the voice of the virtual agent. The virtual agent also logs the final response in a transcript.

Various embodiments of these features will now be discussed with respect to the corresponding figures.

FIG. 1 illustrates an exemplary call agent environment 100 according to embodiments. As shown in FIG. 1, the environment 100 includes an agent workstation 110 connected to a virtual agent system 120. According to various embodiments, the agent workstation 110 is any suitable computing station, including a laptop, desktop, remote terminal, etc. Additionally, according to embodiments, the virtual agent system 120 comprises any number of servers. The agent workstation 110 and the virtual agent system 120 are in communication with each other. According to embodiments, the agent workstation 110 and the virtual agent system 120 communicate with each other wirelessly or over a wired communication link, such as via part of wide area network or local area network.

The agent workstation 110 and the virtual agent system 120 communicate with customers over a network 130, such as the Internet. As shown in FIG. 1, customers may communicate with the agent using a variety of different communication devices. For example, a customer may communicate with the agent using a traditional POTS (plain old telephone system) telephone 140 over a telephone network, a cellular telephone 150 over a cellular or data network, or a computer device 160 over a data network such as the Internet. Regardless of the communication method, the customer contacts the agent via the network, usually by clicking a link on a webpage or dialing a customer service number. The communication from the customer is received at the virtual agent system. The virtual agent system 120 and the agent via the agent workstation 110 function cooperatively in order to serve the needs of the customer, as discussed in further detail below.

Figure 2:
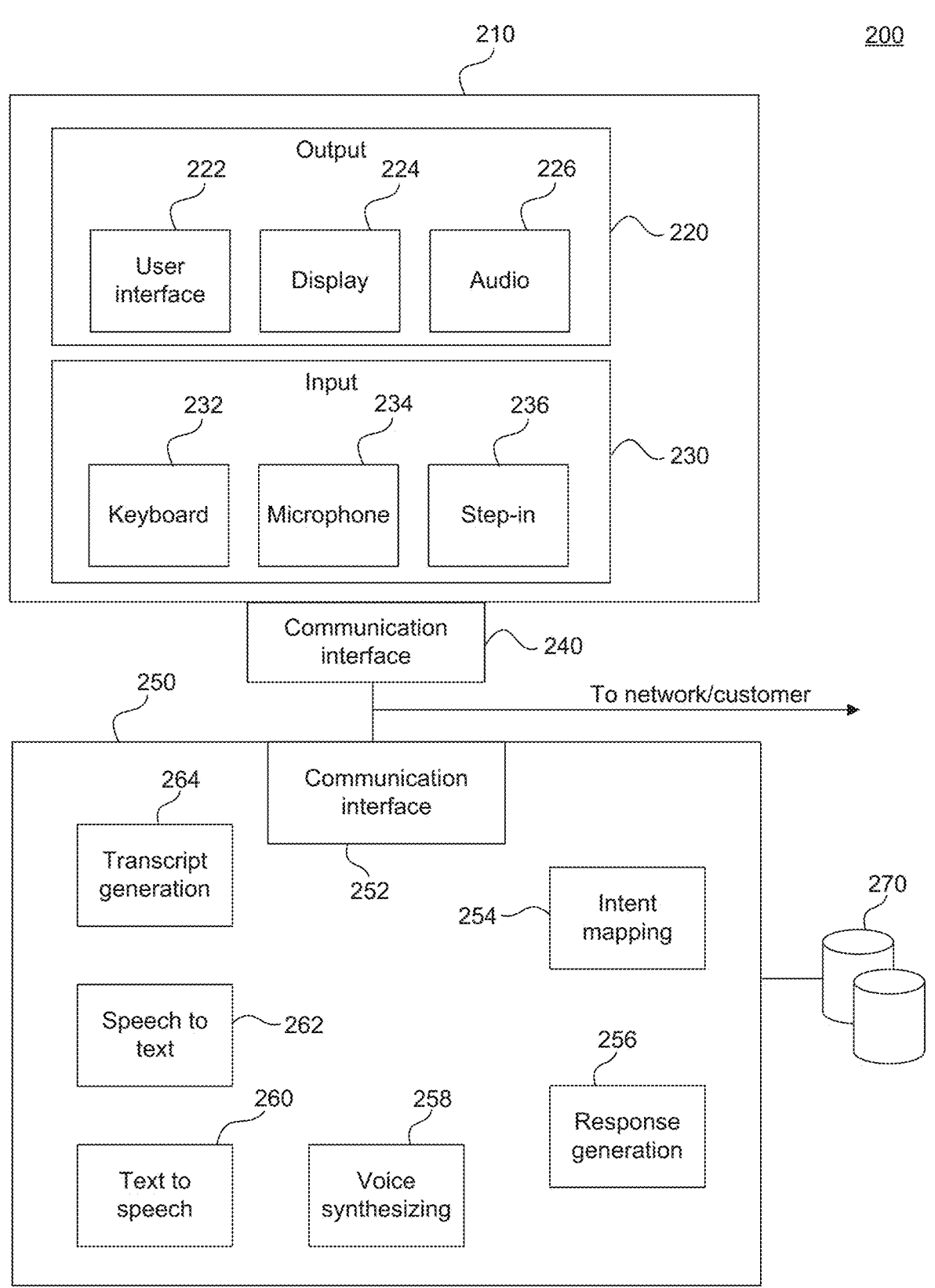
FIG. 2 illustrates a block diagram of an exemplary call agent system according to various embodiments.

FIG. 2 illustrates a block diagram of an exemplary call agent system 200 according to various embodiments. The call agent system 200 includes an agent workstation 210 and a virtual agent system 250. According to embodiments, incoming communications are received at the virtual agent system 250. The virtual agent system includes a communication interface 252 for communicating with external devices, such as the agent workstation 210, the network/customer, or a switchboard, router, or other device configured to manage and distribute incoming communications.

According to various embodiments, the virtual agent system 250 may encompass any number of computing devices and/or servers, and includes several different functional aspects carried out by those devices in order to effectuate customer service. For example, in some embodiments, the virtual agent system 250 includes speech conversion in order to convert back and forth between voice and text as needed. As shown in FIG. 2, the speech conversion includes a speech to text module 262 configured to perform speech recognition analysis on a received voice communication, and convert the voice communication to text. The speech conversion also includes a text to speech module 260 configured to convert text messages prepared by the live or virtual agent to speech for sending to a speech-based customer. In some embodiments, the virtual agent system 250 also includes voice synthesizing functionality 258 configured to generate voice having certain human characteristics. For example, in different embodiments, the voice synthesizing 258 can generate voice matching tones and accents of a particular region associated with the customer, or matching those of the live agent to prevent any dissociation should the live agent need to personally intervene in the call.

In embodiments, the virtual agent system 250 further includes intent mapping 254 configured to discern an intent of a particular customer message. The intent mapping 254 may include a neural network or other machine learning system for parsing out a particular customer message and matching it to a predefined meaning. According to some embodiments, the algorithm is trained with predetermined use cases and functions in practice to identify an intent or meaning of a customer message. In other words, the intent mapping 254 is configured to determine the meaning of a particular customer message.

A response generation 256 receives the results of the intent mapping 254 and generates a proposed response. In an embodiment, a proposed response includes a response message and a response action. The response action is an action proposed to resolve or advance the customer's issue, whereas the response message is a message to be sent back to customer informing them of steps taken and/or providing answers to questions, etc. According to various embodiments, the response message may include one or more different media formats, such as text, audio, video, or multimedia. Transcript generation 264 records messages received from the customers and messages provided to the customers. In an embodiment, the transcript is recorded in a text format only. However, in other embodiments, the transcript is recorded in the same communication format as the communication. Specifically, if the customer communication is a voice communication, the transcript is recorded as an audio transcript. Alternatively, if the customer communication is over chat, then the transcript is recorded as a text transcript. In some embodiments, transcript generation 264 also records proposed responses including response actions and response messages. In embodiments, recording of this additional information can be useful in improving intent mapping 254, or for general review. Notably, the virtual agent system 250 may also be connected to or include one or more databases.

The agent workstation 210 includes a plurality of components to allow a live agent to review proposed responses, prepare final responses, and monitor the various ongoing conversations with current customers. To this end, the agent workstation 210 includes a communication interface 240 to allow it to communicate with the virtual agent system 250. The agent workstation also includes a plurality of output devices 220, including a display 224 such as a monitor, and an audio output 226 such as a speaker. The outputs 220 also include a user interface 222 configured to generate the interface for display to the live agent, as will be discussed in further detail below.

The agent workstation 210 further includes a plurality of input devices 230, including a keyboard 232 for manually typing and/or editing responses or taking other actions, a microphone 234 by which the live agent can provide a voice response or input voice commands, and a step-in command 236 by which the live agent can communicate directly with the customer.

In practice, a customer communication is received at the communication interface 252 of the virtual agent system 250. Depending on the customer and the platform being used, the communication may be either a voice communication (such as a telephone call) or a text communication (such as chat). In the event of a voice communication, the speech to text 262 converts the received voice messages to text format so that they can be more easily analyzed and operated upon. According to embodiments, the speech to text employs speech recognition techniques, such as phoneme detection and mapping. Of course, in the event that the incoming communication is already text-based, this step is skipped.

The text message is then provided to the intent mapping 254 and transcript generation 264. Transcript generation 264 stores the text message in an ongoing transcript of the customer conversation. The intent mapping attempts to determine a meaning (e.g., customer intent) of the text message. Based on the determined intent, response generation 256 generates a proposed response to the customer message. According to embodiments, the proposed response can include one or more both of a proposed response message or a proposed action. For example, when the intent mapping 254 determines that the customer has requested a credit increase, the proposed response may include increasing the credit limit by a determined amount and replying to the customer that the credit limit has been increased. In embodiments, the response message may include one or more different media formats, such as text, audio, video, or multimedia. Once a proposed response has been generated by response generation 256, the virtual agent system 250 forwards the proposed response to the agent workstation 210 for review.

The agent workstation 210 receives the proposed response via the communication interface 240 and is output to the live agent via the output 220. In an embodiment, a current chat history is also received via the communication interface 240. Together, the current chat history and the proposed response are displayed to the live agent via display 224 within the user interface 222. The user interface 222 also provides the live agent with options for editing and/or replacing the proposed response.

Using the input 230, the live agent selects an option within the user interface 222. According to embodiments, those options include approving the proposed response, editing the proposed response, and replacing the proposed response. Upon selecting a desired action, the live agent uses one of the input devices 230 to enter any changes to the proposed response. For example, when "edit" is selected, the live agent may use the keyboard 232 to revise the text of the proposed response message and/or substitute or add other media elements in the message, such as by selecting a different picture, video, or text file for inclusion in the response message. Alternatively, when "replace" is selected, the proposed message is scrapped and the live agent creates a new message from scratch. In this scenario, it may be more efficient to use the microphone 234 to speak the replacement response message. Using the keyboard 232, microphone 234, or other input devices (e.g., mouse), the live agent may also revise the proposed action or carry out actions of their own.

There may be some instances where a customer's issues are too complex for the standard response mechanism to be efficient. In these situations, the live agent may employ the step-in 236 functionality to take over for the virtual agent as the primary point of communication for the customer. As a result, customer communications are still routed through the virtual agent system for purposes of transcription, but the intent mapping 254 and response generation 256 are skipped, and communications are forwarded directly to the live agent. In an embodiment, the intent mapping 254 and the response generation 256 are still carried out in the background for training the computer models associated with those functions or for review. In an embodiment, when the live agent activates the step-in functionality for one of its customers, the live agent's other customers are "transferred" to another live agent. In other words, responsibility for the other customers is given to a different live agent, since the original agent is fully focused on serving the step-in customer.

Once the proposed response has been finalized by the live agent, the agent workstation 210 transmits the finalized response back to the virtual agent system 250 via the communication interface 240 and communication interface 252. Once again, speech conversion is performed at the virtual agent system 250 if needed. For example, if the live agent entered a voice-based replacement response, then the speech to text 262 converts the message to text both for transcription purposes as well as for forwarding to the customer (if the customer is communicating via a text or chat interface). Alternatively, if the finalized message provided by the agent is text-based, the text to speech 260 converts the message to voice for customers that are communicating over a voice call.

Optionally, in any scenario where the response messages are provided to the customer as speech, voice synthesizing may be used in order to customize that speech. For example, the voice synthesizer can be trained with samples of the live agent's voice so that outputs mimic the voice of the live agent. This makes for a more seamless transition in the event that step-in 236 is activated. In another example, voice synthesizing is trained with various accents and dialects for different regions. The output voice messages are then synthesized to match a particular accent/dialect most closely associated with a region of the customer.

Once the output message is finalized, logged, and converted (if necessary), it is provided to the customer as a response to their previous message. Messages continue to be exchanged back and forth between the customer and the virtual agent system 250 in this manner until the customer's issue is resolved or until the communication is otherwise terminated.

Figure 3:
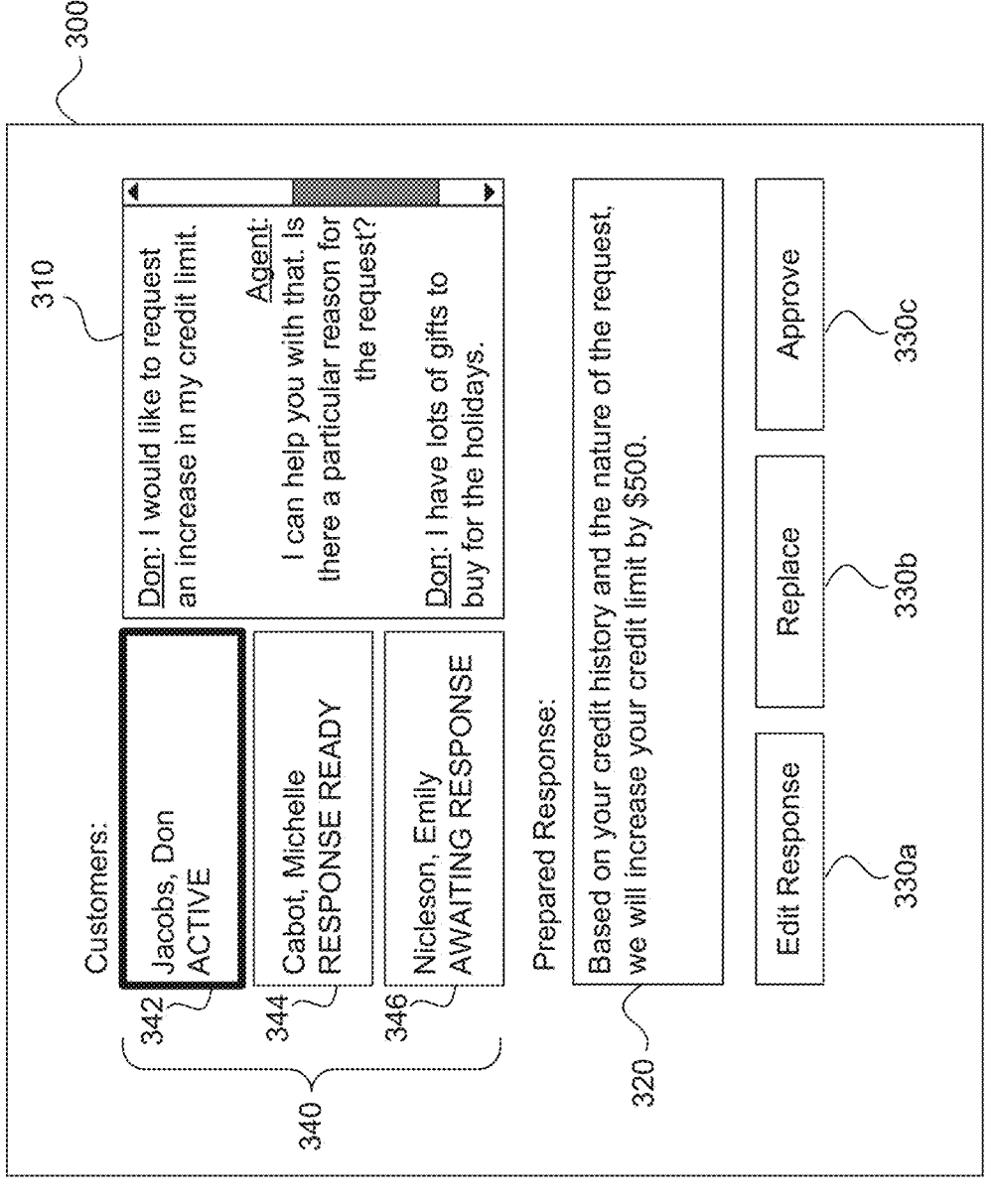
FIG. 3 illustrates a block diagram of an exemplary user interface for use in the call agent system according to various embodiments.

FIG. 3 illustrates a block diagram of an exemplary user interface 300 for use in the call agent system 200 according to various embodiments. In the example of FIG. 3, the user interface is a graphical user interface provided to the live agent via the display 224, and the live agent uses the inputs 230 to interact with the user interface 300.

As shown in FIG. 3, the user interface 300 includes a customer listing 340 that shows all current customers being served by the live agent. In embodiments, the customer listing 340 provides a current status for each of the current customers. For example, the customer listing 340 identifies Don Jacobs as being the ACTIVE customer (e.g., the customer currently being reviewed by the live agent). Similarly, the customer listing 340 indicates that Michelle Cabot is RESPONSE READY, meaning that the virtual agent system 250 has already prepared a response to Michelle's most recent message that is awaiting live agent approval. Finally, Emily Nicleson has not yet provided a new message to the customer service system. This allows the live agent to prioritize which of the different customers they attend to. In an embodiment, each of the customer identifiers 342, 344, and 346 are selectable by the live agent in order to toggle between them.

The user interface 300 also includes a chat window 310 that shows the most recent string of messages between the active customer and the customer service system. In an embodiment, the chat window 310 includes a scrollbar 315 to allow the live agent to review earlier portions of the conversation. This allows the live agent to review the communication with active customer to this point in order to ensure that responses are appropriate, and not duplicative or superfluous, or simply to get familiarized with the history of the conversation.

In some embodiments, the user interface 300 also displays the proposed response 320. In embodiments wherein the proposed response includes proposed actions, those actions can also be listed either separately or annotated within the proposed response message. The live agent reviews the chat history 310 and the proposed response 320, and determines whether to approve or change the proposed response. The user interface 300 provides various selectable buttons by which the live agent can choose to respond. For example, an edit response button 330*a* allows the live agent to edit the proposed response, the replace button 330*b* allows the live agent to submit a replacement response, and the approve button 330*c* allows the user to approve the proposed response. In the event that the live agent selects the edit response button 330*a*, the proposed response 320 becomes text-editable to allows the live agent to revise the text of the response.

Alternatively, in response to the live agent selecting to replace the proposed message via button 330*b*, the user interface 300 can erase the proposed response 320 and allow the user to enter text in the empty text field. In another embodiment, the user interface 300 activates the microphone 234 to allow the live agent to speak a replacement response. In other embodiments, the user interface may provide prompts, menus, buttons or other interface options to allow the user to revise the proposed actions. Once the response message has been approved or finalized by the live agent, the finalized message is forwarded back to the virtual agent system 250. In response, the live agent selects a different customer in the customer list 340 to be the active customer. In an alternative embodiment, the user interface 300 automatically transitions to another customer within the customer list 340 upon receiving the finalized response.

Figure 4:
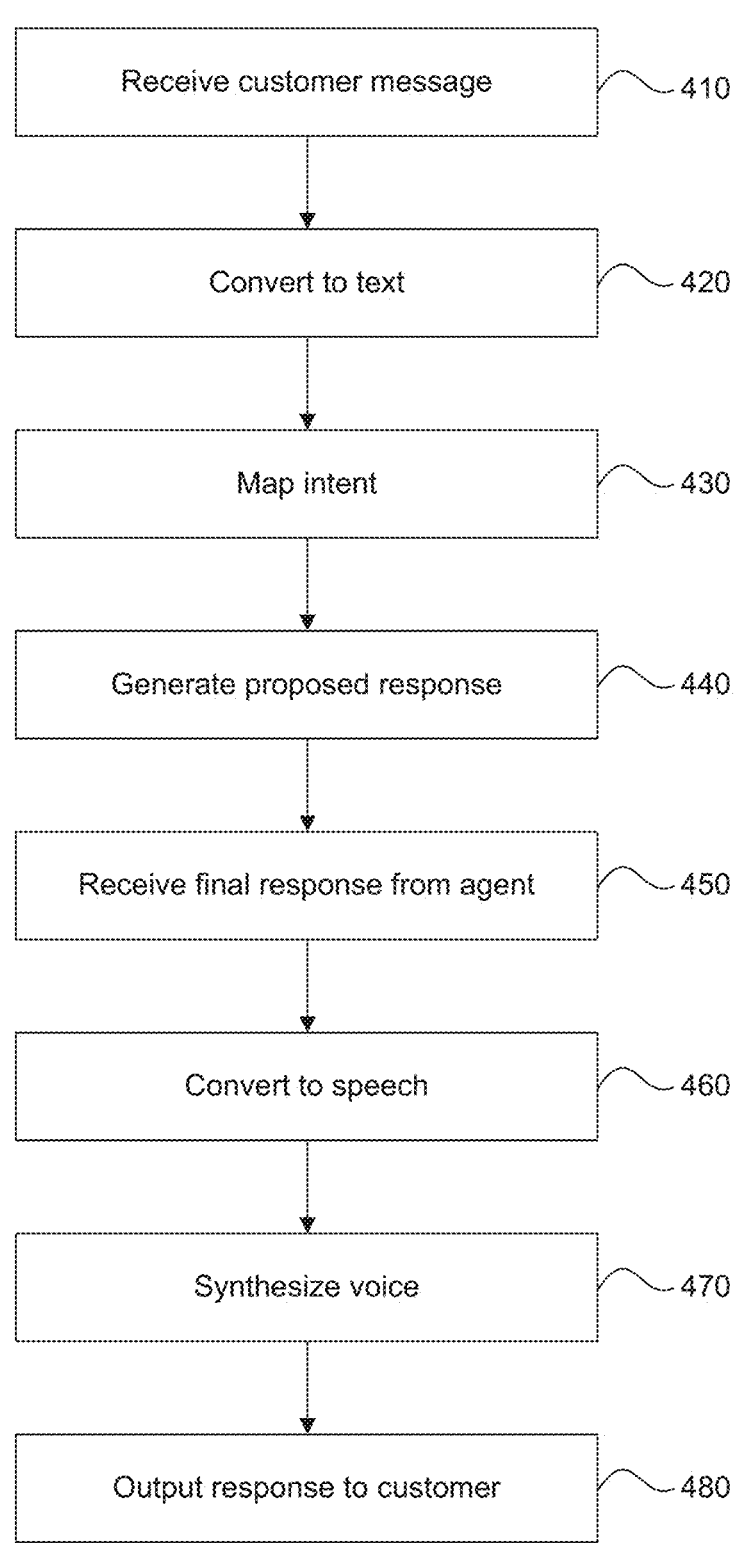
FIG. 4 illustrates a flowchart diagram of an exemplary method for simultaneously serving multiple customers by a call service system according to various embodiments.

FIG. 4 illustrates a flowchart diagram of an exemplary method 400 for simultaneously serving multiple customers by a call service system according to various embodiments. As shown in FIG. 4, a customer message is received in step 410. Then, if the message is speech-based, the message is converted to text in step 420. Once the message is in text format, the virtual agent system maps an intent of the message in step 430. Based on the mapped intent, the virtual agent system generates a proposed response in step 440. According to embodiments, the proposed response may include both a response message and propose a response action to be taken.

Thereafter, the virtual agent system forwards the proposed response to the live agent and receives in response a final response from the agent in step 450. In some situations, the final response will match the proposed response. However, in other situations, the final response will differ from the proposed response, having been edited or completely replaced by the live agent. Upon receipt of the final response, the virtual agent system performs speech conversion, if needed. For example, if the live agent entered a voice-based replacement response, then the message is converted to text both for transcription purposes as well as for forwarding to the customer (if the customer is communicating via a voice call). Alternatively, if the finalized message is text-based, the message is converted to voice for customers that are communicating over a voice call.

For a voice call, the outgoing message may be synthesized in step 470. For example, in different embodiments, the virtual agent system synthesizes the outgoing audio message to match tones and accents of a particular region associated with the customer, or to match those of the live agent to prevent any dissociation should the live agent need to personally intervene in the call. The output message is then transmitted to the customer in step 480.

Figure 5:
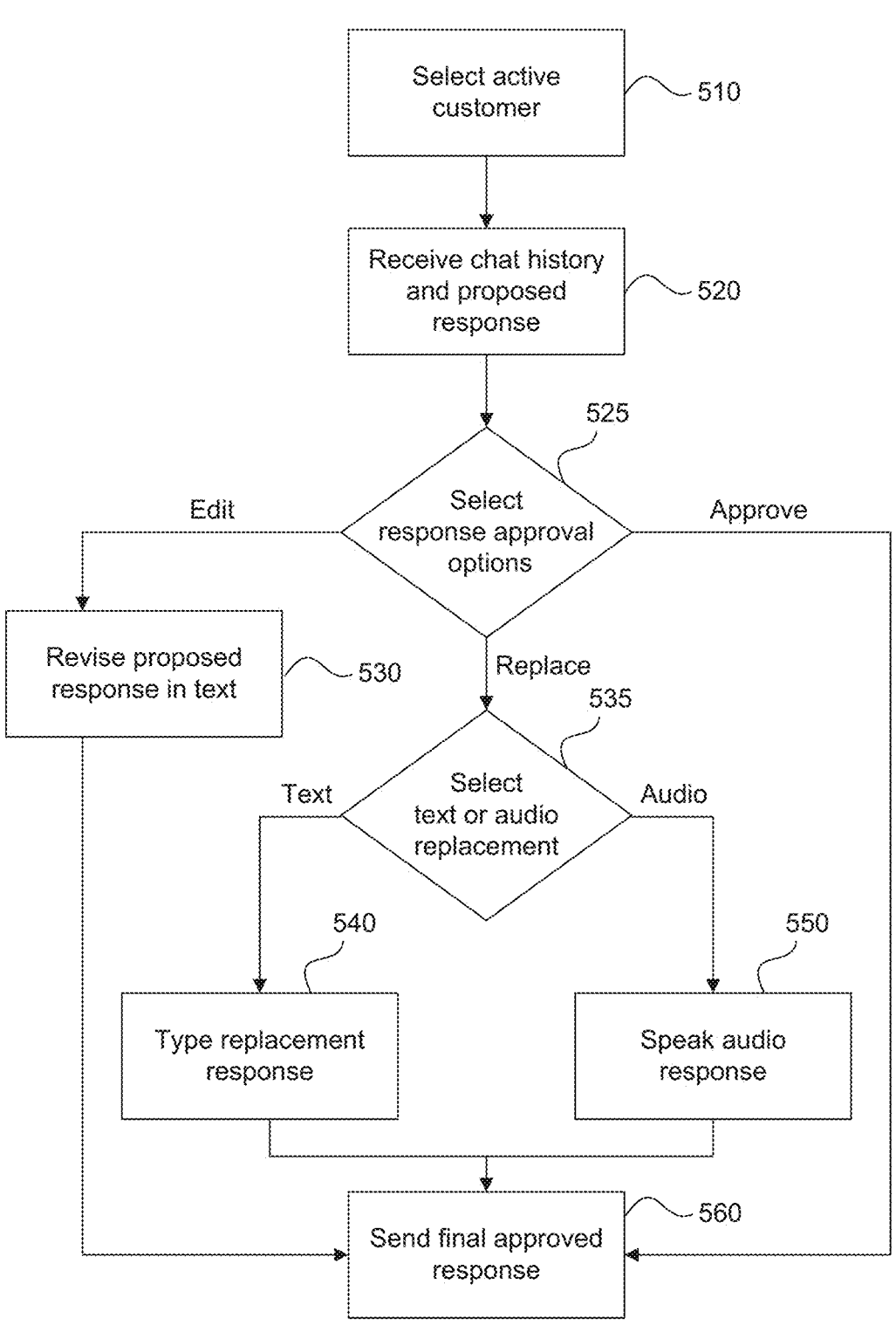
FIG. 5 illustrates a flowchart diagram of an exemplary method for simultaneously service multiple customers by a call service agent according to embodiments.

FIG. 5 illustrates a flowchart diagram of an exemplary method for simultaneously service multiple customers by a call service agent according to embodiments. As shown in FIG. 5, the method 500 begins at 510 with the live agent selecting an active customer from among current customers being monitored by the live agent. According to embodiments, this can be performed by the live agent selecting the customer's name within the user interface, as described above. In response to the selecting, the agent receives the chat history and a proposed response in step 520.

At this point, the agent reviews the chat history in order to gain the context for the response and then reviews the response to determine whether the response is appropriate. As discussed above, in embodiments, the response may include a proposed response message as well as one or more response actions to be taken. The agent reviews the proposed response and selects one of a plurality of response approval options in step 525. For example, the agent can choose to approve the response, edit the response, or replace the response.

In response to the agent selecting to approve the response (525—Approve), the proposed response is transmitted back to the virtual agent system in step 560 as a final response for carrying out and sending to the customer. Alternatively, in response to the agent selecting to edit the proposed response (525—Edit), the agent revises the proposed response by editing the text of the response in step 530. In some embodiments, the editing of the response includes revising proposed actions included in the proposed response. Once the agent has entered the revisions, the revised response is sent back to the virtual agent system as a final response in step 560 for processing and sending to the customer.

Finally, if the live agent selects to replace the proposed response (525—Replace), then the live agent is given the option to enter the replacement response as either a text message or an audio message in step 535. If the agent selects to enter the replacement message via text (535—Text), then the live agent is provided an empty text box and types their replacement message in the text box in step 540. Alternatively, if the agent selects to enter the replacement message via audio (535—Audio), then the microphone is activated and the agent is prompted to speak their response. The agent speaks their response in step 550. Whether replaced with a text message or audio message, the final message is forwarded to the virtual agent system in step 560. As with earlier examples, selecting replacement (525—Replace) can also allow the agent to revise or replace the proposed actions that are provided along with the proposed response message.

Figure 6:
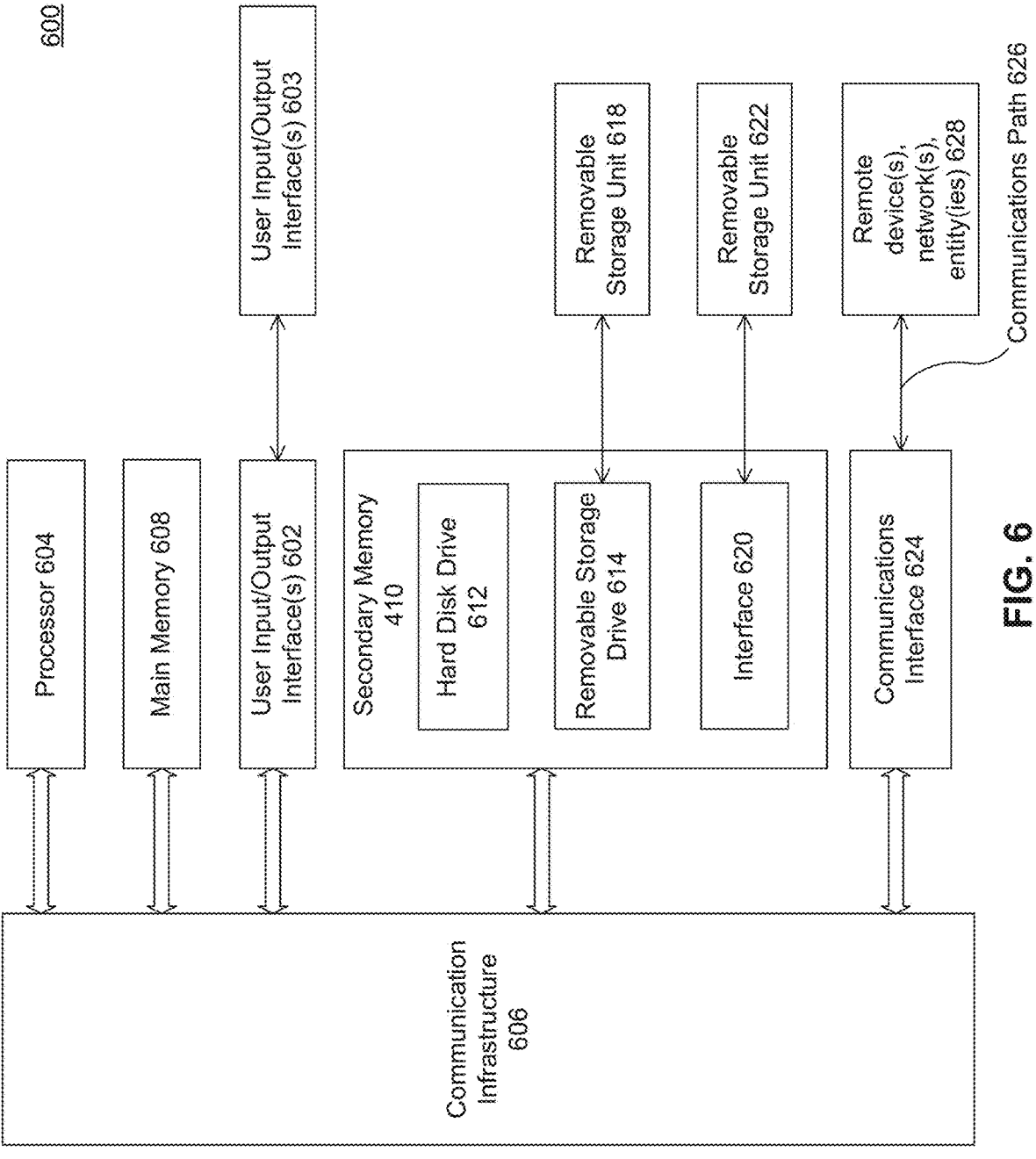
FIG. 6 illustrates an exemplary computer system for implementing some aspects of the disclosure or portion(s) thereof.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A virtual customer service response agent, comprising:
a communication interface configured to communicate with a customer and to exchange information with a live agent; and
one or more processors configured to:
receive a message from the customer via the communication interface;
generate a response to the message that includes a proposed response message and a corresponding proposed response action for responding to the received message;
transmit, via a transceiver, the generated response to the live agent;
receive a final response from the live agent that includes a final response message and a final response action;
perform the final response action in response to receiving the final response; and
transmit, via the transceiver, the final response message to the customer.

2. The virtual customer service response agent of claim 1, wherein the one or more processors are further configured to generate a transcript that includes the received message, the final response message, and the final response action.

3. The virtual customer service response agent of claim 1, wherein the final response message is a text message, and wherein the one or more processors are further configured to convert the text message to speech.

4. The virtual customer service response agent of claim 1, wherein the one or more processors are further configured to provide the live agent an interface through which the live agent can modify the proposed response message and the proposed response action to generate the final response.

5. The virtual customer service response agent of claim 1, wherein the one or more processors are further configured to provide the live agent an interface through which the live agent can replace the proposed response message and the proposed response action to generate the final response.

6. The virtual customer service response agent of claim 1, wherein the one or more processors are further configured to map an intent of the received message.

7. The virtual customer service response agent of claim 1, wherein the proposed response action is responsive to an issue described by the customer in the received message.

8. A live agent workstation for simultaneously servicing a plurality of customers, comprising:
a communication interface configured to exchange information with a virtual agent server;
one or more input devices configured to receive input information from a live agent;
one or more output devices configured to provide output information to the live agent; and
one or more processors configured to:
receive, from the live agent, a selection of an active customer from among a plurality of current customers being serviced by the live agent;
provide, to the live agent via the one or more output devices, a chat history and a proposed response, the proposed response including a proposed response message and a corresponding proposed response action for responding to a recent message received from the active customer;
receive a final response from the live agent via the one or more input devices that includes a final response message and a final response action;
perform the final response action received from the live agent; and
transmit, via the communication interface, the final response message to the virtual agent server.

9. The live agent workstation of claim 8, wherein the one or more processors are further configured to generate a transcript that includes the final response message and the final response action.

10. The live agent workstation of claim 8, wherein the final response message is a text message, and wherein the one or more processors are further configured to convert the text message to speech.

11. The live agent workstation of claim 8, wherein the one or more processors are further configured to provide the live agent an interface through which the live agent can modify the proposed response message and the proposed response action to generate the final response.

12. The live agent workstation of claim 8, wherein the one or more processors are further configured to provide the live agent an interface through which the live agent can replace the proposed response message and the proposed response action to generate the final response.

13. The live agent workstation of claim 8, wherein the one or more processors are further configured to map an intent of the recent message.

14. The live agent workstation of claim 13, wherein the proposed response action is responsive to an issue described by the active customer in the recent message, the issue being identified based on the mapped intent.

15. A method for servicing a plurality of current customers by a live agent, the method comprising:

receiving a message from an active customer from among the plurality of current customers currently being serviced by the live agent;

generating a proposed response to the received message, the proposed response including a proposed response message and a corresponding proposed response action for responding to the received message;

providing the proposed response to the live agent;

receiving a final response from the live agent that includes a final response message and a final response action;

performing the final response action in response to receiving the final response; and providing the final response message to the active customer of the plurality of current customers.

16. The method of claim 15, further comprising generating a transcript that includes the received message, the final response message, and the final response action.

17. The method of claim 15, wherein the received final response message is a text message, the method further comprising converting the text message to speech.

18. The method of claim 15, further comprising providing the live agent an interface through which the live agent can modify or replace at least one of the proposed response message and the proposed response action to generate the final response.

19. The method of claim 15, further comprising mapping an intent of the received message.

20. The method of claim 19, wherein the proposed response action is responsive to an issue described by the active customer in the received message, the issue being identified based on the mapped intent.

* * * * *